3,489,541
METHOD OF TREATING ABRASIVE GRAINS AND PRODUCTS MADE THEREBY
Israel V. Steinberg, Rochester, N.Y., assignor, by mesne assignments, to American Abrasive Corporation, a corporation of Delaware
No Drawing. Filed May 16, 1966, Ser. No. 550,111
Int. Cl. B24d 11/00
U.S. Cl. 51—295　　　　　　　　　　　　　　　　8 Claims

ABSTRACT OF THE DISCLOSURE

Methods of making resin bonded abrasive bodies. Grains of alumina are washed in dilute alkali metal hydroxide, heated to 600° C. to 300° C. for one and one-half to fifteen hours, and rinsed and dried. They are then molded with a bonding resin to form rigid abrasive bodies of improved strength. Alternatively, following the hydroxide treatment, the grains are treated by heating with any of various organic compounds and metallic salts before being molded with the bonding resin.

Brief Summary

This invention relates to novel treatments for abrasive grains, to grains so treated, and to abrasive bodies including them, and, more particularly, to novel methods of treating grains of synthetic alumina to prepare them for subsequent bonding with a phenolic resin to form an abrasive body. This application is a companion to applicant's patent application Ser. No. 550,115, filed concurrently herewith and now U.S. Patent No. 3,423,195 entitled, Method of Treating Abrasive Grains With Iron Compounds and Products Made Thereby.

The use of thermosetting phenolic resins as binders for abrasive bodies is well established. The general techniques for applying phenolic resins to abrasive grains, particularly for the manufacture of rigid abrasive bodies, are described in U.S. Patents Nos. 1,537,454 to Brock; 1,626,246 and its Reissue 19,318 to Martin; 1,989,243 to Nash et al.; 2,076,517 to Robie, and 2,878,111 to Daniels et al.

In general, the basic system described in all the aforementioned patents for the manufacture of phenolic resin bonded abrasive bodies is dependent upon wetting the abrasive grains with a wetting agent, which may be either a liquid thermosetting phenol-aldehyde resin or a solvent for phenolic resins such as furfural, or a combination of both. The wetted abrasive grains are then mixed with sufficient powdered thermosetting phenolic resin to form a relatively dry, pourable mix in which the powdered resin is adhesively secured to the abrasive particles by the wetting agent. The dry mix may be hot pressed and cured in molds, or it may be cold pressed to desired shapes, which are then baked, preferably over an extended period and at gradually increasing temperatures to effect hardening of the resin binder to an infusible condition.

The resultant bodies generally meet many commercial service requirements, but there is a demand for abrasive bodies of this type of improved strength and wear characteristics. Heretofore, considerable improvement has been achieved by various different methods such as, for example, by coating the grains with a silicone material before bonding them, as taught by Daniels et al. in Patent No. 2,878,111.

According to the present invention, I have now found that if the grains of alumina are treated with an inorganic alkali before they are bonded, the bodies made of them are stronger and longer wearing than bodies made of untreated grains or of grains treated according to any of the prior art methods that I am aware of. In addition, I have found that a further improvement can be achieved by following the alkali treatment with any of several different treatments, including among them some of the coating treatments of the prior art.

Briefly, according to the basic process of the invention, the grains of alumina are wetted with an aqueous solution of alkali, typically NaOH, and then heated to about 500° C. to drive off the water and to cause the alkali to react with the grains. After cooling, the grains are washed to remove remaining alkali and loose and soluble reaction products, then dried. They may then be molded to form abrasive bodies of improved strength and wear characteristics, or, alternatively, they may be treated by coating them with an organic material such as a silane, or by treating them with an inorganic oxide. In the alternate case, the resulting bodies have been found to be somewhat stronger than bodies made of grains that have been simply treated with alkali. It has not yet been established, however, that the improvement due to the second treating step is sufficient to justify the extra cost, at least for most utilizations.

The manner in which the treatments of the invention act upon the grains to bring about the observed improvement is not known. It is known, however, that the alkali attacks the aluminum oxide surface and reacts with it to produce water-soluble sodium (or potassium) aluminates. These are found in significant amounts in the wash waters. It is also known that the newly exposed surfaces of the treated grains have substantially more hydroxyl groups than the untreated grains. Analysis of a thoroughly washed and completely dried sample of grains which had been treated with sodium hydroxide showed a many-fold increase in hydroxyl content. This hydroxylated surface is far more highly polar than the untreated grain surface, and, therefore, more compatible with and more adhesive to the phenolic resin, which has many polar hydroxyl and hydroxy methylene groups. There is also a possibility that a true chemical reaction can occur between this hydroxylated surface and the phenolic resin hydroxyl group, since the latter is acidic and the former basic, and since the temperature at which the molded bodies are normally cured (360° F.) may be high enough to effect such a reaction.

The amount of alkali used does not appear to be critical, although for optimum results, an amount equal to at least about 2% by weight of the grains should be used. It is applied as a solution to insure thorough and relatively uniform coverage of all the grains. Several times this amount may be used, if desired, without adverse effect, but also without appreciable further improvement. It is desirable to wash the grains after treatment to avoid excessive alkali reaction with the phenolic resin binder, and, in order to minimize the washing required, it is preferred to use the minimum effective quantity of alkali.

The time of heating also has not been found to be critical. In general, it appears to be necessary only that the entire mass of the wetted grains be heated to some temperature above about 300° C. and held there for only a short time. The time required seems to depend primarily on how long it takes for the heat to penetrate the mass of the grains and for all of the solvent to evaporate. To keep the time within reasonable limits, most of the work in reducing the invention to practice included the step of placing the grains for about two and a half hours in an oven maintained thermostatically at 500° C. A great deal of physical labor is entailed in testing the effects of changes in each of the large number of variables involved in the practice of the invention. It has not yet been possible to determine the optimum conditions for the reaction insofar as heating times and temperatures go. All that can be said on the basis of the present work is that the temperature and time of heating do not appear to be critical, although it is expected that heating at lower temperatures would require longer times, both to bring the grains up to temperature and to accomplish the reaction.

In reducing the invention to practice, commercial synthetic, semi-friable alumina of 46 mesh was used, and the test procedure used to mold the treated grains into shaped bodies and to measure the flexural strengths of the bodies was as follows:

The ambient humidity was controlled throughout the process at about 50% RH.

43.8 grams of liquid phenolic resin, commercially designated BRL-2534 (available from the Bakelite Corp.) was mixed into a mass of 2144 grams of grains by an ordinary food mixer running for about three minutes.

adequate to optimize the results. Any quantity above 2 wt. percent is largely superfluous, and merely makes washing more difficult than otherwise.

As to heating, bodies made of grains heated with 2% by weight of alkali for 15 hours at 300° C., were comparable in strength to those made of grains heated for 1½ hours at 600° C., and of grains treated for 4½ hours at 400° C.

Treatment with KOH in place of NaOH provides a significant improvement relative to untreated grains, but according to the results of the present work, the improvement is not as great as with NaOH. This is shown by the following table which lists results for bodies made from a single batch of grain. The NaOH treatment also appears to be superior in respect to moisture resistance.

TABLE I

| Alkali | Amount | Heating | | Flexural strength | | Percent wet degradation |
| --- | --- | --- | --- | --- | --- | --- |
| | | Temp., (° C.) | Time (hrs.) | Dry | Wet | |
| KOH | 2% | 300 | 15 | 4,253 | 3,833 | 10.0 |
| KOH | 2% | 400 | 4.5 | 4,778 | 4,328 | 9.4 |
| KOH | 2% | 500 | 2.5 | 4,556 | 3,837 | 15.8 |
| KOH | 2%/Alcohol | 500 | 2.5 | 4,395 | 3,780 | 14.0 |
| NaOH | 2% | 300 | 15 | 4,980 | 5,273 | Nil |
| NaOH | 2% | 400 | 4.5 | 5,513 | 5,321 | 3.5 |
| NaOH | 2% | 600 | 1.5 | 4,560 | 4,406 | 3.4 |

212.2 grams of powdered phenolic resin commercially designated BRP-5417 (Bakelite Corp.) was pre-blended with a small quantity of carbosota oil (furfural, etc.) in a separate container, and to this the grains previously wetted with the liquid resin were added with constant stirring. Stirring was continued for three to four minutes until the mixture appeared to be uniform.

The mixture was then molded into shaped bodies 6" x 1" x 1" by weighing out about 234 grams of the mixture into a mold and pressing in a hand press at about 6,000 to 7,000 p.s.i.

The bars were then cured by placing them in an oven, which was preheated at 180° F. and programmed to increase in temperature to 360° F. during the next 6 hours. The oven was maintained at 360° F. for 12 hours more and then turned off. The bars were not quenched, but remained in the oven until they cooled to a temperature close to room temperature.

The bars were then tested in a flexural testing machine in which they were supported on supports spaced 5" apart. Force was applied at the mid-point between the two supports until the bars broke. At least five bars were made for each example, and the results averaged to provide a usable relative strength figure.

Using untreated grains, the molded bodies had a flexural strength of about 3800 p.s.i. Using grains treated in accordance with the single stage alkali treatment of the invention, values were obtained consistently above 4600 p.s.i., and in some cases as high as 6,000 p.s.i. The strength figures obtained seemed to vary more in accordance with unknown and uncontrollable factors than in accordance with minor variations in grain treatment. For example, four runs using one batch of grains gave an average strength of 4913 p.s.i., while three runs using another batch treated in substantially the same way, gave an average value of 5395. In all cases, however, the strengths achieved were greatly in excess of the strengths of bodies made of untreated grains.

Because of the variations caused by unknown factors, it is difficult to appraise the effects of changes in the conditions of treatment. As to variations in quantity of alkali, a distinct improvement was noted even when only 0.2% of NaOH was used (based on the weight of the grains being treated). Bars made of grains treated with this relatively small quantity of alkali had an average flexural strength of 4185 p.s.i., with an average deviation of 192 p.s.i. It appears that an amount of 2% NaOH is Another series of tests was made on bars of the standard size, but molded with a different proportion of resin, the resin filling 8% of the volume of the finished bar and being constituted of 20% liquid resin and 80% dry, powdered resin, cured according to the standard cycle, as hereinabove described. Bars made of untreated grains served as controls in this series. Their average flexural strength was 4458 p.s.i. when they were tested dry, and 660 p.s.i. when tested after soaking for three days in an alkaline solution at pH 8.5. This indicated a loss of strength due to soaking of about 85%.

By contrast, bars made of alkaline treated grains that had been heated with 2 wt. percent of NaOH for 2½ hours at 500° C. had an average flexural strength, dry, of 5100 p.s.i., and, after soaking for three days along with the control bars, had an average flexural strength, wet, of 3708 p.s.i. Their loss, or wet degradation, was only about 27%.

A further series of bars was made, using still another proportion of resin. In this series, the bonding resin constituted 10.66%, by weight, of the bars, and was made up of 23% liquid resin and 77% dry, powdered resin. The control bars, made of untreated grains, had an average flexural strength, dry, of 4500 p.s.i., and of 2600 p.s.i. after three days soaking in the alkaline solution. Their wet degradation was 42%. Bars in this series, made of grains treated in accordance with the invention, showed an average strength, dry, of 5300 p.s.i., and of 4900 p.s.i. after the three day soak. Their average wet degradation was only 8%.

Destructive wheel speed tests and wear tests were also carried out. In all cases, every effort was made to insure identity of processing between the control wheels and wheels made of grains treated according to the invention. The destructive wheel speed tests were made using wheels 6 inches in diameter by 1 inch thick. Soaking was in tap water at room temperature. The results are shown in Table II.

TABLE II

| | Untreated | Treated |
| --- | --- | --- |
| Breaking speed, dry (s.f.p.m.) | 19,550 | 21,700 |
| Breaking speed after one week soak (s.f.p.m.) | 16,900 | 21,500 |
| Percent loss | 13.6 | 0.9 |
| Breaking speed after two week soak (s.f.p.m.) | 14,510 | 21,570 |
| Percent loss | 25.8 | 0.6 |

For the wear tests, cut-off wheels, 16 inches in diameter and ⅛ inch thick, were made up in L grade. The control wheels were made of commercially available grains of semi-friable alumina, ceramically coated with red iron oxide, which is widely used in cut-off wheels because of its generally recognized superior bonding properties. The wheels were tested by making six cuts each through 2½ inch diameter, hot rolled steel rod. The control wheels suffered an average loss of 3.641 inches in diameter. Wheels made of grains treated according to the invention suffered an average loss in diameter of only 2.922 inches.

The invention also contemplates a two stage process in which the grains are treated as hereinabove described, washed, and then treated by heating with a material capable of reacting with OH or ONa radicals at elevated temperatures. The following materials have been tried, and, although the work was not extensive enough clearly to demonstrate superiority over the single stage treatment in all cases, all of the results showed definite improvement over untreated grains. In this work, test bars were molded, cured, and tested, as described hereinabove, in connection with the examples first given.

vinyltriethoxy silane,
gamma-aminopropyltriethoxy silane, available commercially under the trade name A-1100,
saliciamide of aminosilane,
phenyltriethoxysilane
2-[3,4-epoxycyclohexyl]ethyltrimethoxy silane, available commercially under the trade name Y-4086,
the reaction product produced in situ of Y-4086 and p-hydroxybenzoic acid,
the reaction product produced in situ of Y-4086 and m-aminophenol,
the reaction product (pre-reacted) of Y-4086 and salicylic acid,
the reaction product produced in situ of 3-glycidyloxypropyltrimethoxysilane, available commercially under the trade name Z-6040, and p-hydroxybenzoic acid,
the reaction product produced in situ of X-6040 and salicylic acid,
the reaction product produced in situ of Z-6040 and anthranilic acid,
ferric sulfate,
ferric nitrate (decomposed on heating to yield iron oxide),
chromyl chloride
ammonium zirconylcarbonate (decomposed on heating to zirconium oxide),
Quilon-R (B-resorcylato chromic chloride).

In the examples listed in Table III, the grains were initially treated by heating them with 2% by weight of NaOH in an oven held at 500° C. for the times indicated. They were then allowed to cool, were washed, and dried thoroughly. Reagents for the second step treatment were then added in alcohol solution to insure thorough and uniform coverage of the grains. The amount of the second step reagent used was .0018 mole per 1000 gamma of grains. The grains were then placed in an oven at 200° C. for 7 hours.

TABLE III

| NaOH Conc., percent | Heating Time, hours | 2d step reagent | Average breaking stress p.s.i. |
|---|---|---|---|
| 2 | 2.5 | Vinyltriethoxysilane | 5,160 |
| 2 | 2.5 | Silane A-1100 | 5,925 |
| 2 | 7.0 | do | 5,610 |
| 2 | 2.5 | Salicylamide of aminosilane | 4,850 |
| 2 | 2.5 | Silane Y-4086 | 4,566 |
| 2 | 2.5 | Phenyltriethoxysilane | 4,482 |
| 0.5 | 7 | Silane A-1100 | 5,504 |
| 1.0 | 7 | do | 5,205 |
| 0.1 | 2.5 | do | 5,265 |
| 0.3 | 2.5 | do | 5,130 |
| 0.5 | 2.5 | do | 5,283 |
| 2 | 2.5 | do | 4,998 |
| 2 | 4.5 | do | 5,318 |
| 2 | 7.0 | do | 5,495 |

The last eight examples in this table were made in an effort to determine the effect of variations in the amount of NaOH used and the duration of heating in the first treatment step. It has not yet been possible satisfactorily to explain the inconsistent and, apparently, anomalous nature of some of the results observed. It is clear, however, that all of these examples are much stronger than are bars made of untreated grains.

Another group of test bars was made using 2 wt. percent NaOH and heating at 500° C. for 2.5 hours for the first stage. The second stage comprised wetting the grains with an alcohol solution of silane Y-4086 and p-hydroxybenzoic acid in amounts calculated to produce .0018 mole of reaction product per 1150 grams of grains. The wetted grains were then heated at 200° C. for 7 hours, and allowed to cool. They were then molded into bars, as hereinabove described. These bars had an average flexural strength of 5000 p.s.i.

Another series of bars was made using 2 wt. percent NaOH, and heating for 2.5 hours at 500° C. as a first stage. The second stage consisted of wetting the grains with a solution containing .0018 mole per 1150 grams of grains of the reaction product of silane Y-4086 and salicylic acid, then heating at 200° C. for 7 hours. These bars showed an average flexural strength of 5018 p.s.i.

Four groups of bars were made of grain that had been subjected to the same first stage treatment, then wetted with alcohol solutions containing Y-4086 epoxy silane and m-aminophenol, and heated at 200° C. for 7 hours to form the reaction product in situ of the silane and the aminophenol. The results are shown in Table IV.

Table IV

| Moles of reaction product per 1150 grams of grains: | Average breaking stress |
|---|---|
| .0009 | 5255 |
| .0018 | 5475 |
| .0027 | 5588 |
| .0036 | 5422 |

Yet another batch of grains was made using the same first stage treatment. The second stage comprised wetting the grains with a solution containing silane Z-6040 and p-hydrobenzoic acid in sufficient quantity to form .0018 mole of their reaction product per 1150 grams of grains. The wetted grains were then heated at 200° C. for 7 hours, cooled, and molded into test bars. These bars showed a flexural strength of 5408 p.s.i.

Still other bars were made of grains treated in similar fashion, but using for the second stage the reaction product formed in situ of silane Z-6040 and salicylic acid in an amount equal to about .0018 mole per 1150 grams of grain. These bars had a flexural strength of 5133 p.s.i.

When the in situ reaction product in the second stage was that of silane Z-6040 and anthranilic acid, the test bars showed an average flexural strength of 5188 p.s.i.

Table V shows the results achieved when the grains were first heated with 2 wt. percent NaOH at 500° C. for 2.5 hours, and thereafter heated for 7 hours at 200° C. with various different quantities of a mixture of silane Y-4086 and p-hydroxybenzoic acid.

Table V

| Moles of reaction product of silane and PHB per 1150 grams | Average breaking stress, p.s.i. |
|---|---|
| .0009 | 4920 |
| .0018 | 5000 |
| .0027 | 5306 |
| .0036 | 5555 |
| .0045 | 4710 |
| .0054 | 4688 |

A number of test bars were also made of grains that were first heated with 2 wt. percent NaOH at 500° C. for either 2.5 or 4.5 hours, then wetted with a solution containing one or two weight percent of ferric nitrate, based on the dry weight of the grains, and then heated at 500° C. for 2.5 hours. The results achieved are shown in Table VI.

TABLE IV

| Heating time, 1st stage | Percent nitrate | Breaking stress, p.s.i |
|---|---|---|
| 2.5 hours | 1 | 5,318 |
| Do | 2 | 5,145 |
| 4.5 hours | 1 | 5,202 |

The ferric nitrate changes, when heated, to iron oxide, which is thought to react with or to penetrate partly into the alumina, forming additional reactive sites on the surfaces of the grains.

Another series of bars was made of grains that had been heated with 2 wt. percent NaOH for 2.5 hours at 500° C., cooled, washed until they no longed caused the wash water to become alkaline, and then wetted with an aqueous solution of ferric sulfate; again washed, and finally oven dried. This batch of grain weighed 2400 grams, and the ferric sulfate solution was made up of 85 grams ferric sulfate (anhydrous basis) and 200 cc. of water. The bars showed an average flexural strength of 4440 p.s.i.

A series of bars was made of 2100 grams of grains that had been given the same first stage treatment, then wetted with a solution of 4.2 grams of chromyl chloride in 100 cc. of benzene, allowed to stand at room temperature for 24 hours, washed with water, and dried. These bars had an average flexural strength of 4448 p.s.i.

A series of bars was made of 1150 grams of grains that had been given the same first stage treatment, and then treated with zirconium oxide by wetting them with 57.5 grams of ammonium zirconyl carbonate (equivalent to 5.75 grams zirconium oxide) and heating at 500° C. for 2.5 hours. These bars had an average flexural strength of 5175 p.s.i.

Yet another series of bars was made of grains that had been given the same first stage treatment, then treated with Quilon-R. The grains were mixed with 3.7 grams of Quilon-R solution (31.2% solids) in 50 cc. of water, allowed to stand at room temperature overnight, then oven dried. The resulting bars had an average flexural strength of 4853 p.s.i.

What is claimed is:

1. Method of treating grains of alumina preparatory to bonding them together with a heat hardenable organic resin to form an abrasiev body comprising the steps of coating the grains with an alkali metal hydroxide, heating the grains so coated to between about 300° C. and 600° C. to cause the hydroxide to react with the grains, and thereafter washing the grains to remove unreacted alkali and loose and soluble reaction product therefrom.

2. Method of treating grains of alumina preparatory to bonding them together with a heat hardenable organic resin to form an abrasive body comprising the steps of coating the grains with sodium hydroxide, and then heating the grains so coated to a temperature between about 300° C. and 600° C. to cause the hydroxide to react with surface portions thereof.

3. Method of treating grains of alumina preparatory to bonding them together with a heat hardenable organic resin to form an abrasive body comprising the steps of coating the grains with at least about 0.2 weight percent of sodium hydroxide based on the total weight of the grains, heating the grains so coated for one and one-half to fifteen hours at 600° C. to 300° C., and thereafter washing the grains to remove unreacted alkali and loose and soluble reaction product therefrom.

4. Alumina abrasive grain treated in accordance with the process of claim 2.

5. A heat-hardened resin-bonded abrasive body comprising grains of alumina treated in accordance with the process of claim 2.

6. Method of treating grains of alumina preparatory to bonding them together with a heat hardenable organic resin to form an abrasive body comprising the steps of reacting the grain with sodium hydroxide between about 300° C. and 600° C., thereafter washing the grains to remove unreacted alkali and loose and soluble reaction product therefrom, and thereafter heat reacting the grains with a material selected from the group consisting of:
vinyltriethoxysilane,
gamma-aminopropyltriethoxysilane,
salicyamide of aminosilane,
phenyltriethoxysilane,
2-[3,4-epoxycyclohexyl]ethyltrimethoxysilane,
the reaction product produced in situ of 2-[3,4-epoxycyclohexyl]ethyltrimethoxysilane and p-hydrobenzoic acid,
the reaction product produced in situ of 2-[3,4-epoxycyclohexyl]ethyltrimethoxysilane and m-aminophenol,
the reaction product (pre-reacted) of 2-[3,4-epoxycyclohexyl]ethyltrimethoxysilane and salicylic acid,
the reaction product produced in situ of 3-glycidyloxypropyltrimethoxysilane, and p-hydroxybenzoic acid,
the reaction product produced in situ of 3-glycidyloxypropyltrimethoxysilane and salicylic acid,
the reaction product produced in situ of 3-glycidyloxypropyltrimethoxysilane and anthranilic acid,
ferric sulfate,
ferric oxide,
chromyl chloride,
zirconium oxide,
B-resorcylato chromic chloride.

7. Alumina abrasive grain treated in accordance with the process of claim 6.

8. A heat-hardened resin-bonded abrasive body comprising grains of alumina treated in accordance with the process of claim 6.

References Cited
UNITED STATES PATENTS

| 2,213,332 | 9/1940 | Ball | 51—298 |
| 2,216,135 | 10/1940 | Rainier | 51—298 |
| 2,294,239 | 8/1942 | Novotny | 51—298 |
| 2,878,111 | 3/1959 | Daniels | 51—298 |
| 1,037,999 | 9/1912 | Saunders | 51—308 |
| 2,541,658 | 2/1951 | Masin | 51—308 |

DONALD J. ARNOLD, Primary Examiner

U.S. Cl. X.R.

51—298; 106—308; 117—100